C. PETERSEN.
ADJUSTABLE DOUBLETREE.
APPLICATION FILED JULY 3, 1912.
1,079,021.
Patented Nov. 18, 1913.
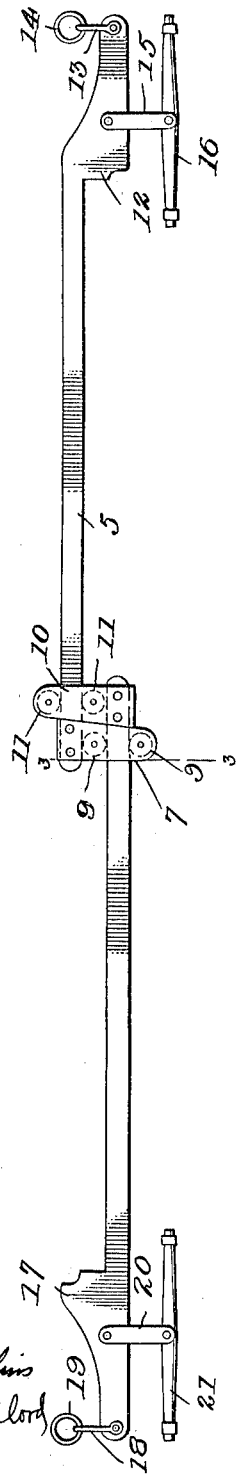
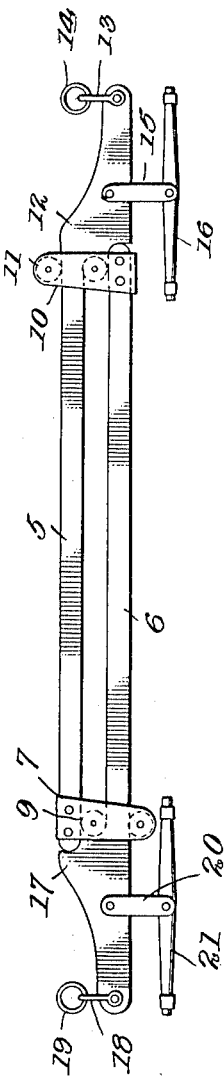
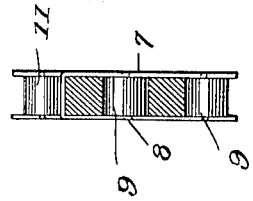

UNITED STATES PATENT OFFICE.

CHARLES PETERSEN, OF SAN FRANCISCO, CALIFORNIA.

ADJUSTABLE DOUBLETREE.

1,079,021. Specification of Letters Patent. Patented Nov. 18, 1913.

Application filed July 3, 1912. Serial No. 707,412.

*To all whom it may concern:*

Be it known that I, CHARLES PETERSEN, a subject of the King of Denmark, residing at San Francisco, in the county of San Francisco and State of California, have invented certain new and useful Improvements in Adjustable Doubletrees, of which the following is a specification.

This invention relates to improvements in extensionable doubletrees and is especially designed for use in connection with vineyard and orchard plows, and its object is to permit of a ready adjustment of the distance between two plows or cultivators connected with the doubletree.

Another object of the invention is to provide a strong doubletree with two extensible sections slidably connected to each other by an anti-friction coupling, and to permit the ready adjustment of the relation of two plows and the animals hitched thereto, to each other, so as to avoid the side draft incident to such implements.

With the above and other objects in view, the invention consists in certain combinations, constructions, and arrangements of parts, clearly described in the following specification and illustrated in the accompanying drawings, in which:—

Figure 1 is a plan view showing the sections of the doubletree extended their full limit; Fig. 2 is a plan view showing the sections contracted; Fig. 3 is an enlarged sectional view taken on line 3—3 of Fig. 1, showing the anti-friction rollers of the coupling.

Referring to the accompanying drawings, 5 and 6 denote the two bar sections of the double tree, which are rectangular in cross-section, are substantially duplicates of each other, and may be made of any suitable material. The section 5 carries on its inner end a pair of plates 7 and 8, which are rigidly bolted to the opposite sides of said section, and are extended to provide portions which slidably engage the section 6. Between the plates 7 and 8, anti-friction rollers 9 are mounted, and contact with the opposite edges of the section 6. The section 6 carries a similar pair of plates, only one, 10, being shown, and between these plates, anti-friction rollers 11 are mounted to contact with the forward and rear edges of the section 5. The plates 7 and 8 project forwardly from the section 5, and the plates 10 project rearwardly from the section 6, and are adapted to engage each other to limit the outward movement of the sections on each other, as shown in Fig. 1. The rollers, 9 and 11, carried by the plates, prevent binding of the two sections in their longitudinal movements or adjustments.

The outer end of the section 5 is forwardly offset to form a widened terminal portion 12, and carries thereon a clevis 13, and a plow connecting ring 14 on its extreme outer end, and straps 15, located inwardly of the clevis 13 and projecting forwardly, are pivotally connected with a swingletree 16, the outer end of which is substantially flush with the outer end of section 5.

The outer end of section 6 is rearwardly offset at 17, and carries a clevis 18 on its extreme outer portion, to which a plow connecting ring 19 is secured. Straps 20 are connected to the offset end 17 of the section 6, extend forwardly and carry a swingletree 21 on their forward ends, the outer end of the swingletree being substantially flush with the outer end of section 6.

When the two sections are moved inwardly on each other, the offset end 17 will abut against the inner end of the section 5, and the offset end 12 will abut against the inner end of section 6, as shown in Fig. 2.

The improved extensionable doubletree will be found especially useful in connection with vineyard and orchard plowing, where care must be exercised to prevent the horses from injuring the vines, or where low hanging limbs prevent the horses working close to the trees, it being understood that the plows attached to the rings 14 are offset from the ends of the doubletree.

In the ordinary method of vineyard plowing a single plow, drawn by a single horse is used. By using the adjustable doubletree, two plows, drawn by two horses, can be used, thereby counteracting the side draft of vineyard plows and as the slidable connection between the sections of the doubletree permits of the ready adjustment of the distance relation between the plows, as will be found necessary, owing to the difference in the distance between the furrows made by the plows or cultivators.

What I claim is:—

1. In combination, a pair of doubletree sections, a coupling secured to the inner end of each section and slidably engaging the other section, roller bearings carried by said couplings and engaging the edges of said sections, said couplings being adapted to abut against each other to limit the outward movement of the sections on each other, swingletrees carried by the outer ends of said sections.

2. In combination, a pair of doubletree sections, couplings carried by the inner ends of each section and slidably bridging the other section and adapted to abut against each other, a forwardly offset end portion on one of said sections and adapted to engage the coupling of the other section, a rearwardly offset end portion on the other section and adapted to engage the remaining coupling, swingle trees pivoted to the offset ends of the sections and having their outer ends flush with the outer ends of said sections, and plow connections carried by the outer ends of said sections.

In testimony whereof I affix my signature in the presence of two witnesses.

CHARLES PETERSEN.

Witnesses:
EUGENE BRAND,
ROBERT PARKER.

---

Copies of this patent may be obtained for five cents each, by addressing the "Commissioner of Patents, Washington, D. C."